(12) United States Patent
Kizmann et al.

(10) Patent No.: US 6,567,252 B2
(45) Date of Patent: May 20, 2003

(54) PROTECTION CIRCUIT FOR A POWER SUPPLY UNIT AND RESPECTIVE POWER SUPPLY UNIT

(75) Inventors: Eugen Kizmann, Villingen-Schwenningen (DE); Reinhard Kögel, Brigachtal (DE); Jean-Paul Louvel, Villingen-Schwenningen (DE)

(73) Assignee: Thomson Licensing S.A., Boulogne, Cedex (FR)

( * ) Notice: Subject to any disclaimer, the term of this patent is extended or adjusted under 35 U.S.C. 154(b) by 220 days.

(21) Appl. No.: 09/737,403

(22) Filed: Dec. 15, 2000

(65) Prior Publication Data

US 2001/0006447 A1 Jul. 5, 2001

(30) Foreign Application Priority Data

Dec. 30, 1999 (DE) .......................................... 199 64 049

(51) Int. Cl.$^7$ .............................. H02H 7/00; H02H 3/24
(52) U.S. Cl. ......................... 361/91.1; 361/18; 361/90; 361/92; 307/43; 363/74
(58) Field of Search .............................. 361/90, 92, 18, 361/91.1; 307/43; 327/100; 363/74

(56) References Cited

U.S. PATENT DOCUMENTS

| | | | |
|---|---|---|---|
| 4,591,779 A | * 5/1986 | Carpenter et al. | 323/255 |
| 4,876,636 A | * 10/1989 | Rilly et al. | 363/21.15 |
| 4,916,569 A | * 4/1990 | Konopka | 323/271 |
| 5,872,704 A | * 2/1999 | Kim | 363/20 |

FOREIGN PATENT DOCUMENTS

| | | |
|---|---|---|
| DE | 28642 | 5/1964 |
| DE | 244447 | 4/1987 |

OTHER PUBLICATIONS

Search Report for German Patent Appln. No. 19964049.1.
Das interessante IC: Spannungsuberwachung SG 1548. In: ELO, Ausg. 2, 1988, S. 81, 82.

* cited by examiner

Primary Examiner—Kim Huynh
(74) Attorney, Agent, or Firm—Joseph J. Tripoli; Harvey D. Fried; Joseph J. Kolodka

(57) ABSTRACT

The protection circuit for a power supply unit comprises a switching stage, at which at least two output voltages to be monitored are connected, these voltages being isolated from one another by means of resistors. Arranged here in the connection path of the output voltages is a diode, which turns on and thereby triggers the switching stage in the event of a fault, when there is a drop in one of the output voltages. In this way, the switching stage provides information which acts on a control loop of the power supply unit, so that the power supply unit switches off. The protection circuit also includes a passive network with a resistor and a capacitor, which prescribes a time constant, after which the protection circuit permits renewed starting of the power supply unit. The switching stage may be realized, for example, by a transistor stage, which provides the information signal for the event of a fault for the power supply unit when turning on occurs. This circuit allows a plurality of output voltages of the power supply unit concerned to be monitored in a simple way with respect to a short-circuit, or an undervoltage.

5 Claims, 1 Drawing Sheet

PROTECTION CIRCUIT FOR A POWER SUPPLY UNIT AND RESPECTIVE POWER SUPPLY UNIT

BACKGROUND

The invention is based on a protection circuit with a switching stage for a power supply unit which, in the event of a fault, for example a short-circuit, supplies a fault signal for the power supply unit.

Protection circuits of this type are often used in switched-mode power supply units in order to switch them off reliably in the event of a short-circuit in particular, so that no components, such as the switching transistor or components of the output side for example, are destroyed by overloading. DE-A-197 35 208, for example, discloses a switched-mode power supply unit which has on the primary side switching means which effect reliable switching off of the switching transistor in the event of a short-circuit on the secondary side. The arrangement of the switching means on the primary side has the effect here that, if there is a short-circuit, the voltage is reduced to a low value directly at the gate terminal of the switching transistor, so that the said transistor cannot turn on again. The occurrence of a short-circuit is detected here at an auxiliary winding of the isolation transformer on the primary side.

The object of the present invention is to specify a protection circuit for a power supply unit with a plurality of output voltages which effects reliable switching off of the power supply unit in the event of a short-circuit of one of the output voltages, and a power supply unit with a relevant protection circuit.

SUMMARY OF THE INVENTION

The protection circuit of the present invention includes a switching stage, at which at least two output voltages to be monitored are connected, these voltages being isolated from one another by means of resistors and diodes. Arranged here in the connection path of the output voltages is a diode, which turns on and thereby triggers the switching stage in the event of a fault, when there is a drop in one of the output voltages. No diode is necessary for the last output voltage. In this way, the switching stage provides a control signal which acts on a control loop of the power supply unit, so that the power supply unit switches off.

The protection circuit also includes a passive network with a resistor and a capacitor, which prescribes a time constant, after which the protection circuit permits renewed starting of the power supply unit. The switching stage of the protection circuit may be realized, for example, by a transistor stage or an operational amplifier, which provides the information signal for the event of a fault for the power supply unit when turning on occurs. This protection circuit allows a plurality of output voltages of the power supply unit concerned to be monitored in a simple way with respect to a short-circuit or an undervoltage.

Applications of the protection circuit arise in particular for television sets and video recorders, the power supply units of these devices are predominantly switched mode power supply units, in particular flyback converters. Use of the protection circuit for non-switching, linear power supply units is likewise possible, however.

BRIEF DESCRIPTION OF THE DRAWING

The invention is explained in more detail below by way of example with reference to a schematic diagram, in which the FIGURE shows a protection circuit with a switching stage for monitoring a plurality of output voltages.

DESCRIPTION OF THE PREFERRED EMBODIMENT

Figure 1:
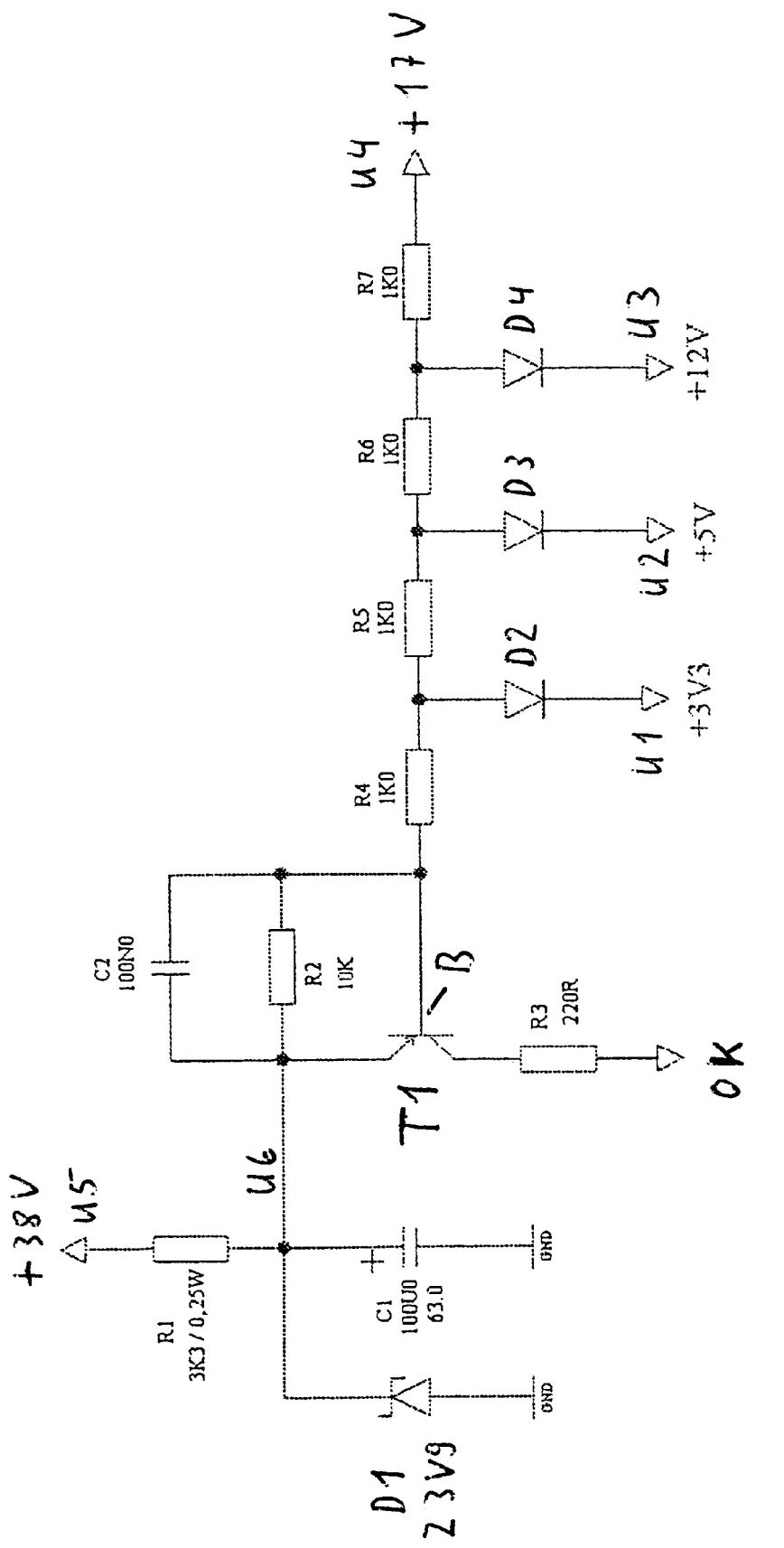

The protection circuit of the FIGURE includes a switching stage, in this exemplary embodiment a transistor T1, which is wired as a switch and to the control input B of which the output voltages U1–U4 to be monitored are connected. Lying here at the control input B is a series-connected chain of resistors with resistors R4, R5, R6 and R7, to the connecting points of which an output voltage U1, U2 and U3 to be monitored is respectively connected and to the end of which a further output voltage U4 is connected. Arranged in the connection path of the voltages U1, U2 and U3 there is respectively a diode D2, D3 or D4, which diodes are connected in the reverse direction with respect to the voltages U1, U2 and U3, so that these voltages are isolated from one another and do not mutually influence one another. No diode is necessary for the last voltage U4, since this voltage is likewise isolated from the other voltages U1 to U3 by the diodes D2 to D4.

The voltages U1–U4 to be monitored are arranged here at the chain of resistors R4–R7 in such a way that greater voltage values lie in ascending sequence progressively further away from the control input B of the transistor stage T1. This simplifies the dimensioning of the chain of resistors R4–R7, since when there is a drop in one of the voltages U1 to U4 this voltage concerned must reliably turn on the transistor T1.

In this exemplary embodiment, the transistor T1 of the switching stage is a pnp transistor, at the emitter of which an operating voltage U6 is present. The control input B of the transistor T1 is likewise connected to the operating voltage U6 via a resistor R2 and a capacitor C2 connected in parallel with the latter, so that the control input B of the transistor T1 is at high level when the voltage U6 is applied and the transistor T1 turns off.

The operating voltage U6 is derived from a voltage U5 of the power supply unit through a passive network, comprising a resistor R1, a capacitor C1 and a Zener diode D1. This involves the capacitor C1 being slowly charged by the resistor R1 when the power supply unit is switched on, so that the operating voltage U6 is present with a delay at the transistor T1. The Zener diode D1 has the effect of limiting the operating voltage U6 to a low value. When the power supply unit is switched on, the transistor T1 therefore turns off reliably, unless there is a short-circuit, since the voltages U1 to U4 are present at an earlier time than the voltage U6, and the voltage at the control input B is normally always greater than or equal to the emitter voltage, the voltage U6 of the transistor T1. If one of the voltages U1 to U4 drops significantly, for example in the event of a short-circuit, the switching stage T1 turns on and emits a control signal via a resistor R3 to the power supply unit.

The voltage U5, resistor R1 and capacitor C1 are dimensioned here in such a way that the operating voltage U6 builds up as slowly as possible after the voltage U5 is applied.

The protection circuit may be arranged in particular on the secondary side of a switched-mode power supply unit, in which the control loop monitors an output voltage on the secondary side, for example via an optocoupler OK. The resistor R3 may lie directly at the control loop of the power supply unit, for example at a connection of the optocoupler OK on the secondary side. As a result, the capacitor C1 is discharged when the transistor T1 turns on, since the power supply unit switches off until the voltage U5 drops to a value of approximately 2 volts, at which the optocoupler OK turns off. As a result, the power supply unit starts again, but no longer runs up to the full value of the voltage U5 as long as one of the output voltages U1 to U4 has a short-circuit. The transistor T1 then turns on again. As a result, a cyclical switching on of the power supply unit is obtained as long as the short-circuit exists, although the further time intervals of the cycles are not as long as the first switching-off cycle. This considerably reduces the loading of the switching transistor and other components of the power supply unit in the event of a short-circuit.

What is claimed is:

1. Protection circuit for monitoring output voltages of a power supply unit comprising
    a switching stage with a control input, to which at least two output voltages of said power supply unit are coupled, said output voltages being isolated from one another respectively by means of a diode and a resistor,
    a passive network for generating an operating voltage for said switching stage from a further output voltage of said power supply unit,
    said passive network providing said operating voltage for said switching stage with a delay, after switching on of said power supply unit, so that said control input is pulled up by the output voltages to be monitored before said operating voltage is present at said switching stage;
    in the event of a fault of one of said output voltages, in particular in case of a short-circuit, said switching stage providing an information signal for said power supply unit, so that said power supply unit switches off and reduces said output voltages as well as said operating voltage and herewith resetting said information signal, so that said power supply unit subsequently turns on and providing a cyclically switching on of said power supply unit as long as said fault exists.

2. Protection circuit according to claim 1, wherein said passive network comprises a resistor and a capacitor for generating said operating voltage.

3. Protection circuit according to claim 1, wherein said passive network comprises a Zener diode, by which said further operating voltage is limited to a value which corresponds approximately to the voltage value of the lowest output voltage to be monitored.

4. Protection circuit according to claim 1, wherein the switching stage comprises a transistor stage, at the control input of which the output voltages to be monitored are present.

5. Protection circuit according to claim 1, wherein said output voltages to be monitored are coupled to a series circuit of resistors in such a way that greater voltage values lie in ascending sequence progressively further away from the control input of said switching stage.

* * * * *